United States Patent
Tolompoiko et al.

(10) Patent No.: US 10,140,619 B2
(45) Date of Patent: Nov. 27, 2018

(54) DYNAMIC CREATIVE CREATION AND DELIVERY

(75) Inventors: Aleksei Tolompoiko, Cumming, GA (US); Justin Haygood, Marietta, GA (US); Phillip J. Markert, Jr., Kennesaw, GA (US); Timothy C. Van Meter, Atlanta, GA (US)

(73) Assignee: SIZMEK TECHNOLOGIES, INC., Atlanta, GA (US)

( * ) Notice: Subject to any disclaimer, the term of this patent is extended or adjusted under 35 U.S.C. 154(b) by 784 days.

(21) Appl. No.: 13/165,586

(22) Filed: Jun. 21, 2011

(65) Prior Publication Data

US 2012/0016736 A1    Jan. 19, 2012

Related U.S. Application Data

(60) Provisional application No. 61/357,401, filed on Jun. 22, 2010.

(51) Int. Cl.
    *G06Q 30/02*    (2012.01)

(52) U.S. Cl.
    CPC ......... *G06Q 30/02* (2013.01); *G06Q 30/0244* (2013.01)

(58) Field of Classification Search
    CPC .................................................. G06Q 30/02
    USPC ............. 725/35; 709/219; 715/530; 424/490
    See application file for complete search history.

(56) References Cited

U.S. PATENT DOCUMENTS

| | | | |
|---|---|---|---|
| 7,870,577 B2* | 1/2011 | Haberman et al. | 725/35 |
| 8,131,799 B2* | 3/2012 | Landsman et al. | 709/203 |
| 2004/0123247 A1* | 6/2004 | Wachen et al. | 715/530 |
| 2006/0259588 A1* | 11/2006 | Lerman et al. | 709/219 |
| 2009/0083396 A1 | 3/2009 | Roos | |
| 2010/0247661 A1* | 9/2010 | Hokenson et al. | 424/490 |

FOREIGN PATENT DOCUMENTS

| | | |
|---|---|---|
| JP | 2009-075540 A | 4/2009 |
| KR | 10-2009-0056506 A | 6/2009 |
| KR | 10-2010-0018674 A | 2/2010 |
| WO | 2004-075466 A2 | 9/2004 |

* cited by examiner

*Primary Examiner* — Saba Dagnew
(74) *Attorney, Agent, or Firm* — M&B IP Analysts, LLC

(57) ABSTRACT

A method and system for generating a creative script is disclosed. Plug-ins into a third party ad creation tool interact through application program interface (API) to allow insertion of dynamic aspects into the creative script. Alternative content is defined for each dynamic aspect inserted into the creative. One or more content groups are defined that select a number of dynamic aspects and their corresponding alternative content. The different combinations of alternative content are culled to define each content group. Target attributes are selected into a target group. The creative script is served according to the combinations of alternative content. Those combinations that are deemed more acceptable are favored over time to increase efficacy of the creative script.

17 Claims, 6 Drawing Sheets

DYNAMIC CREATIVE CREATION AND DELIVERY

This application claims the benefit of and is a non-provisional of U.S. Provisional Application Ser. No. 61/357,401 filed on Jun. 22, 2010, entitled "DYNAMIC CREATIVE CREATION & DELIVERY," which is hereby expressly incorporated by reference in its entirety for all purposes.

This application expressly incorporates by reference U.S. application Ser. No. 12/332,823, filed on Dec. 11, 2008, entitled "SYSTEMS AND METHODS FOR GENERATING, REVIEWING, EDITING, AND TRANSFERRING AN ADVERTIZING UNIT IN A SINGLE ENVIRONMENT," in its entirety for all purposes.

BACKGROUND

This disclosure relates in general to ad creatives and, but not by way of limitation, to designing and serving ad creatives.

Internet advertizing is on a phenomenal growth trajectory. Evolving from simple banner ads, there are any number of different types of Internet ads that embed video, expand outside the banner, allow interaction, and other rich experiences into the web page of a browser or other application software. Analytics tools allow closely monitoring how viewers interact with the ads. The dilemma is determining how successful a particular ad campaign is performing.

When putting together an ad campaign, there are often many different versions of the same basic ad. These variants are manually created for the various different types of ad locations and sizes. Analytics tools allow tracking each variant of an ad separately. When an ad is not performing according to expectation, there is no analytic way to determine what the problem might be and what to change to make the ad resonate better with viewers.

SUMMARY

In one embodiment, the present disclosure provides a method and system for generating a creative script. Plug-ins into a third party ad creation tool interact through application program interface (API) to allow insertion of dynamic aspects into the creative script. Alternative content is defined for each dynamic aspect inserted into the creative. One or more content groups are defined that select a number of dynamic aspects and their corresponding alternative content. The different combinations of alternative content are culled to define each content group. Target attributes are selected into a target group. The creative script is served according to the combinations of alternative content. Those combinations that are deemed more acceptable are favored over time to increase efficacy of the creative script.

In another embodiment, a system for generating a dynamic creative is disclosed. The system includes a module and a platform. The module is added to a third-party creation tool that allows selecting from a plurality of structures. The plurality of structures are selectable from within the third-party creation tool, wherein each of the plurality of structures is configured to switch between a plurality of alternative selections when the creative is run, for graphically-manipulated insertion into the creative, and for integration into a script representing the creative. The platform is configured to: receive selection of a content group that correlates to the plurality of alternative selections, receive selection of a target group comprising a plurality of attributes describing viewers of the creative, determine that a viewer of the creative is in the target group, select an alternative selection from the plurality of alternative selections, process the alternative selection with a structure from the plurality of structures to customize the creative to the alternative selection that is associated with the content group, receive feedback on how the content group is being received by the target group, and modify how often the plurality of alternative selections are presented in the script for the target group.

In yet another embodiment, a method for generating a dynamic creative is disclosed. In one step, a plurality of structures are provided that are selectable from within a third party creation tool. Each of the plurality of structures is configured: to switch between a plurality of alternative selections when the creative is run, for graphically-manipulated insertion into the creative, and for integration into a script representing the creative. Selection of a content group is received that correlates to the plurality of alternative selections. Selection of a target group is received that is comprised of a plurality of attributes describing viewers of the creative. It is determined that a viewer of the creative is in the target group. An alternative selection is chosen from the plurality of alternative selections. The alternative selection is processed with a structure from the plurality of structures to customize the creative to the alternative selection that is associated with the content group. Feedback is received on how the content group is being received by the target group viewing the dynamic creative. How often the plurality of alternative selections are presented is modified in the script for the target group.

In yet another embodiment, one or more physical machine-readable media having machine-executable instructions configured to generating a dynamic creative is disclosed. The one or more physical machine-readable media comprising code for: providing a plurality of structures that are selectable from within a third party creation tool, wherein each of the plurality of structures is configured: to switch between a plurality of alternative selections when the creative is run, for graphically-manipulated insertion into the creative, and for integration into a script representing the creative; receiving selection of a content group that correlates to the plurality of alternative selections; receiving selection of a target group comprising a plurality of attributes describing viewers of the creative; determining that a viewer of the creative is in the target group; selecting an alternative selection from the plurality of alternative selections; processing the alternative selection with a structure from the plurality of structures to customize the creative to the alternative selection that is associated with the content group; receiving feedback on how the content group is being received by the target group; and modifying how often the plurality of alternative selections are presented in the script for the target group.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. If the same reference label is used in the specification, the description is applicable to any one of the similar components having the same reference label.

DETAILED DESCRIPTION

Figure 1:
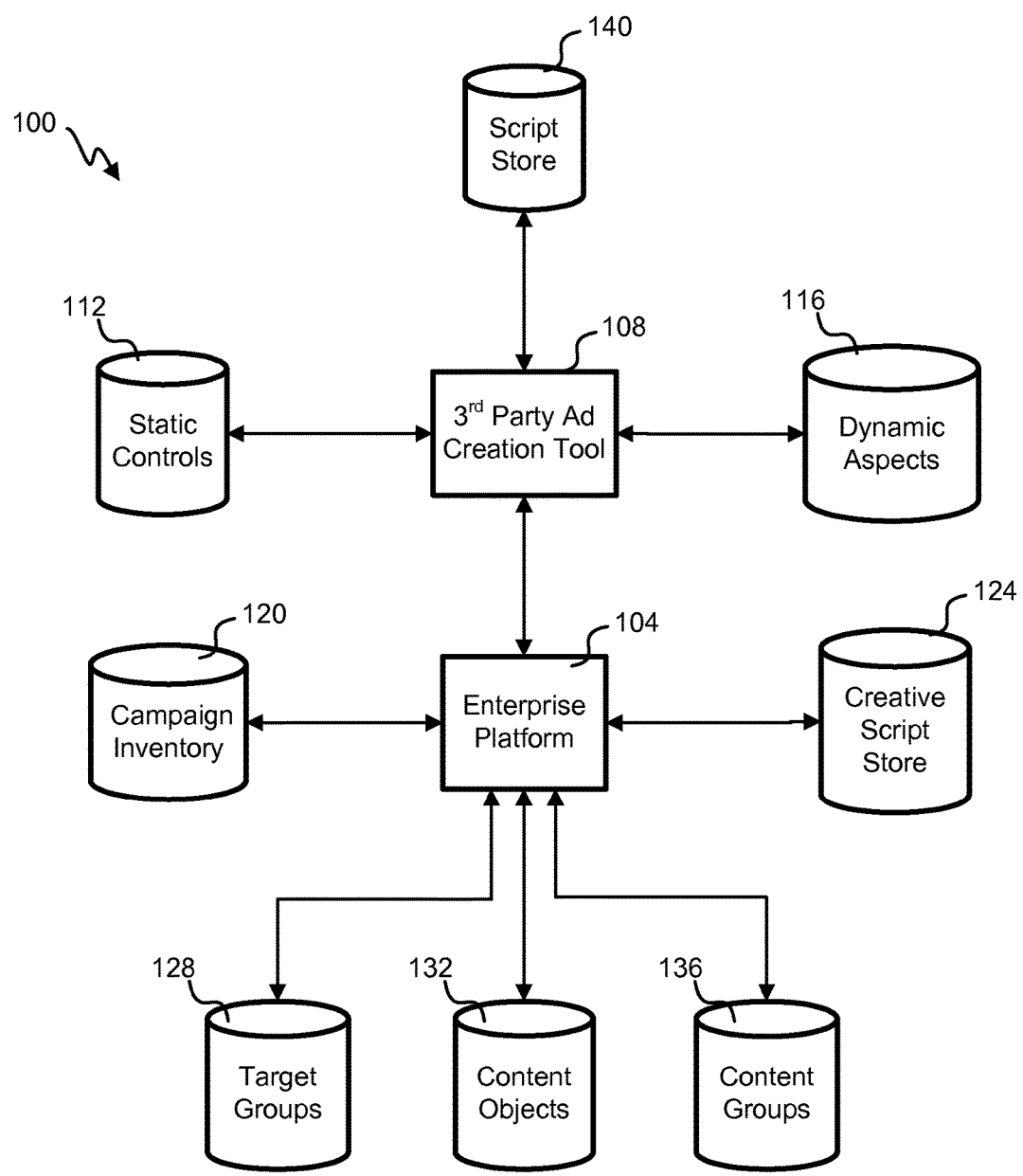
FIG. 1 depicts a block diagram of an embodiment of a dynamic creative generation system.

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims Referring first to FIG. 1, an embodiment of a dynamic creative generation system 100 is shown in block diagram form. A creative script template or ad script is generated using an off-the-shelf third-party ad creation tool 108. Various embodiments could use any creative authoring environment for the third-party ad creation tool 108 (e.g., Adobe Flash™, Microsoft Silverlight™, etc.). Application program interface(s) (API) allow selecting dynamic aspects 116 and static controls 112 beyond any functionality built-into the third-party ad creation tool 108 itself. The APIs allow selection of a starting point for the ad script, namely, a creative script template that the designer can add static controls 112 and dynamic aspects 116 to. For example, a drag-and-drop graphical function can be used in some embodiments to place a dynamic aspect 116 into the creative script template that will form the ad script.

The third-party ad creation tool 108 has the ability to store the ad script in a script store 140. Each dynamic aspect 116 is linked to a framework in the ad script that allows changing-out aspects dynamically when the ad script is delivered such that end users (i.e., viewers) can have different versions of the ad render in their browser. The framework can be thought of as a container that holds an amorphous aspect that changes dynamically according to the parameters specified by designer of the ad. For example, the size, location or appearance of the dynamic aspect 116 can be specified to change according to some scheme. For a particular instantiation of the creative, a value is assigned to each dynamic aspect such that the ad script renders in a predetermined way.

The ad script can be published to a creative script store 124 through an enterprise platform 104 for further configuration. In one embodiment, the enterprise platform 104 is a cloud-based service that is accessible through a web interface. In some embodiments, the enterprise platform 104 is also accessed from the third-party ad creation tool 108 using plug-ins and/or other APIs. The designer of the ad creative (or some other person in the process) interacts with the web interface to further configure the creative and select campaigns to deliver the creative with. The enterprise platform 104 interfaces with various exchanges, publishers and networks that deliver the ads according to advertizing campaigns. The campaigns can be for individual sites, zones within a site or groups of sites. Each campaign may have limitations on the types of ads that can be served, for example, banner size, resolution, scripting language, overlay, roll-out, pop-up, etc.

The designer defines the different content for each dynamic aspect 116 defined in creative script template from the third-party ad creating tool 108. For example, an image dynamic aspect may be linked in the alternative to three different images as options. Table I gives an example of three dynamic aspects 116 that could be in the ad script, specifically, a close ad button, a text field and an image are dynamic. The close button aspect can have four different optional locations. There are other options for the close button aspect that can also be defined (e.g., button color, button style, font, pixel dither, etc.) that are not shown in this example. Options can be ranges in some cases, for example, color spectrum, font size, location movement, a subset of available photos, etc. One can define ranges within each option, for example, integer font sizes from 8 to 14 point type.

TABLE I

Dynamic Script Creative Aspects

| Dynamic Aspect | Dynamic Option | Other Options |
|---|---|---|
| Close Button | Upper Right Location | Color, Button Style, Font |
| | Upper Middle Location | Color, Pixel Dither, Font |
| | Upper Left Location | Pixel Dither, Font |
| | Lower Right Location | Color, Pixel Dither, Font |
| Text Field | "Goodbye Friend" | Text Color, Font, Size, Background Color |
| | "Aloha" | Size, Background Color |
| | "Audios Amigo" | Text Color, Font, Background Color |
| Image | . . . \sunset.jpg | Size, Resolution, Location |
| | . . . \ocean.jpg | Resolution, Location |
| | . . . \mountains.jpg | Size, Location |

The example in Table I also allows changes to the text field aspect to allow for different languages and/or messages. Additionally, an image aspect can use any of three different images. The designer can define different options for any number of different options or just a single value for each option. For the "Other Option" column, only a single value is defined in this embodiment, but any of these options could blossom out into any number of different values. The content objects referenced in the dynamic options are stored in a content object store 132 and are available when the creative is delivered to the viewer. Some embodiments could use a content delivery network (CDN) or origin server to host the content objects outside of the dynamic creative generation system 100.

The various combination of options for the dynamic aspects 116 are defined into a number of content group 136 by the designer. A particular content group 136 defines the combination of options for the dynamic aspects 116 in a particular ad script such that it can be rendered for the end user in a unique way. Each combination of options defines the variables needed for rendering an instance of the ad creative. Initially, all the different option combinations that were preliminarily selected are presented to the designer. Some combinations may be automatically deactivated to be excluded from the possible content groups 136. The designer can deactivate other option combinations or reactivate those automatically deactivated, for example, black text on a black background could be automatically or manually deactivated. Table II gives an example of the different possible option combinations of the three dynamic aspects from Table I. With four options on the close button aspect, three for the text field aspect and three for the image aspect, there are thirty-six different possible option combinations (i.e., n=36). The designer manually or the exchange platform 104 automatically has excluded combination 04 as a possible content group 136 in this example. In an ad creative with more dynamic aspects and ranges of variables, the permutations for the instances of the creative can be quite large.

TABLE II

Option Combinations for Dynamic Aspects in Ad Creative

| Content Group | Close Button | Text Field | Image | Exclude? |
|---|---|---|---|---|
| 01 | Upper Right | "Goodbye Friend" | . . . \sunset.jpg | No |
| 02 | Upper Middle | "Goodbye Friend" | . . . \sunset.jpg | No |
| 03 | Upper Left | "Goodbye Friend" | . . . \sunset.jpg | No |
| 04 | Lower Right | "Goodbye Friend" | . . . \sunset.jpg | Yes |
| 05 | Upper Right | "Aloha" | . . . \sunset.jpg | No |
| 06 | Upper Middle | "Aloha" | . . . \sunset.jpg | No |
| . . . | . . . | . . . | . . . | . . . |
| n | Lower Right | "Audios Amigo" | . . . \mountains.jpg | No |

Target groups 128 available to campaigns are defined by the designer. Available campaigns are stored in a campaign inventory store 120. As a separate process, the campaign inventory store 120 is populated with the different sites, pages and groups of sites and pages that can serve ads. Table III shows m different target groups 128 and the "Campaign(s)" column shows the campaign inventory 120 that is available in this example. The different attributes for these campaigns are age group, geography and gender, but other embodiments could have any number of attributes for each target group 128. The attributes could be demographic information and/or behavioral information of the viewer.

TABLE III

Target Groups

| Target | Campaign(s) | Age Group | Geography | Gender |
|---|---|---|---|---|
| 01 | Sports Sites | 31-35 | Phoenix | M |
| 02 | College Sites | 18-21 | Tempe | M |
| 03 | Sport Channel | 31-35 | Hawaii | — |
| 04 | Sports Sites | — | Mexico | M |
| 05 | College Sites | 18-21 | Tempe | F |
| 06 | Sport Channel | — | Hawaii | — |
| . . . | . . . | . . . | . . . | . . . |
| m | Sport Channel | — | — | M |

In this example, target group 06 uses a sport channel campaign with end viewers of any age in the state of Hawaii that are any gender with the "-" representing "don't care" or "don't know." More specific target groups are used before less specific ones, for example a 32 year old in Hawaii would be in target group 03 rather than target group 06. If outside the 31-35 age group or if age is unknown, target group 06 would be used for an end user determined to be in Hawaii.

Figure 2:
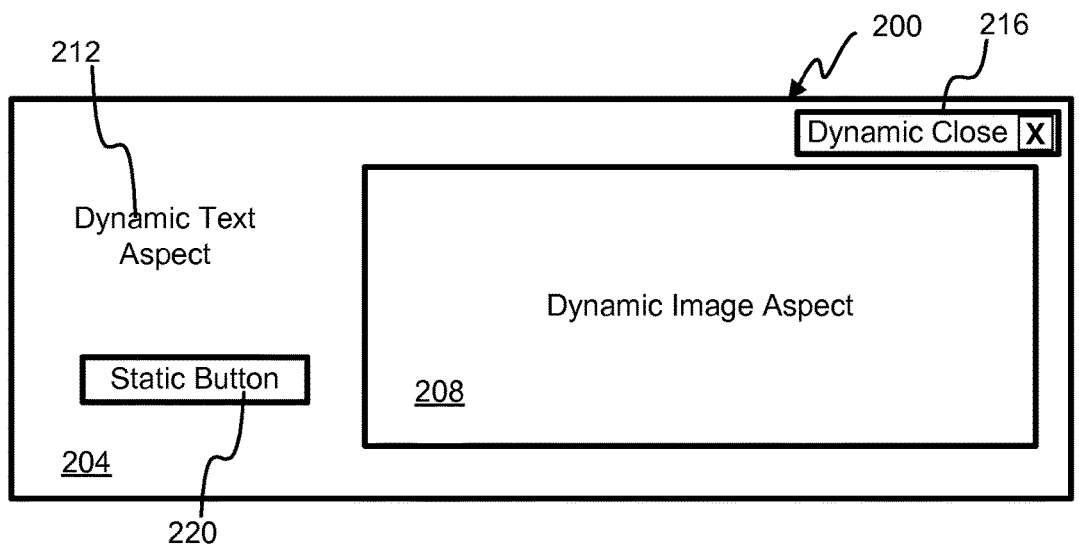
FIG. 2 depicts a screen shot of an embodiment of a creative script template that can be formulated in a third-party ad creation tool.

With reference to FIG. 2, a screen shot of an embodiment of a creative script template 200 is shown that can be formulated by the designer in the third-party ad creation tool 108. In this example, there are both static controls 112 (i.e., static button 220 and ad window 204) and dynamic aspects 116 (text aspect 212, close button 216 and image aspect 208). This embodiment uses the enterprise platform 104 to define and track the dynamic nature of the ad once created. The third-party ad creation tool 108 allows the designer to define a creative script template 200 of what is static or dynamic design element. Each dynamic aspect 116 is linked to a framework that appears in the script commands. The framework dynamically switches between option combinations of the dynamic aspect 116 based upon attributes of the ad viewer that fall in a target group. This dynamic customization is performed prior to delivery when the ad script is compiled in this embodiment. Other embodiments could run the ad script as it is rendered for the viewer at run-time.

Any size ad script with any number of static controls 112 and dynamic aspects 116 could be formulated only limited by the creativity of the designer. Different options could generate hundreds, thousands or more combinations of the ad to deliver many unique experiences. Those option combinations meeting the most success are emphasized with a larger proportion of the impressions going forward. The enterprise platform 104 tracks success of a particular option combination and will favor that version of the ad. Trending is provided by trying some of the less favored option combinations randomly to see if tastes of end users have changed such that a formerly disfavored option combination may now be favored. The possible options that define the dynamic aspects 116 allow changing messages, images to use, colors, font size and type, call-to-action, click-through URL, dithering, image resolution, image location, etc.

Figure 3:
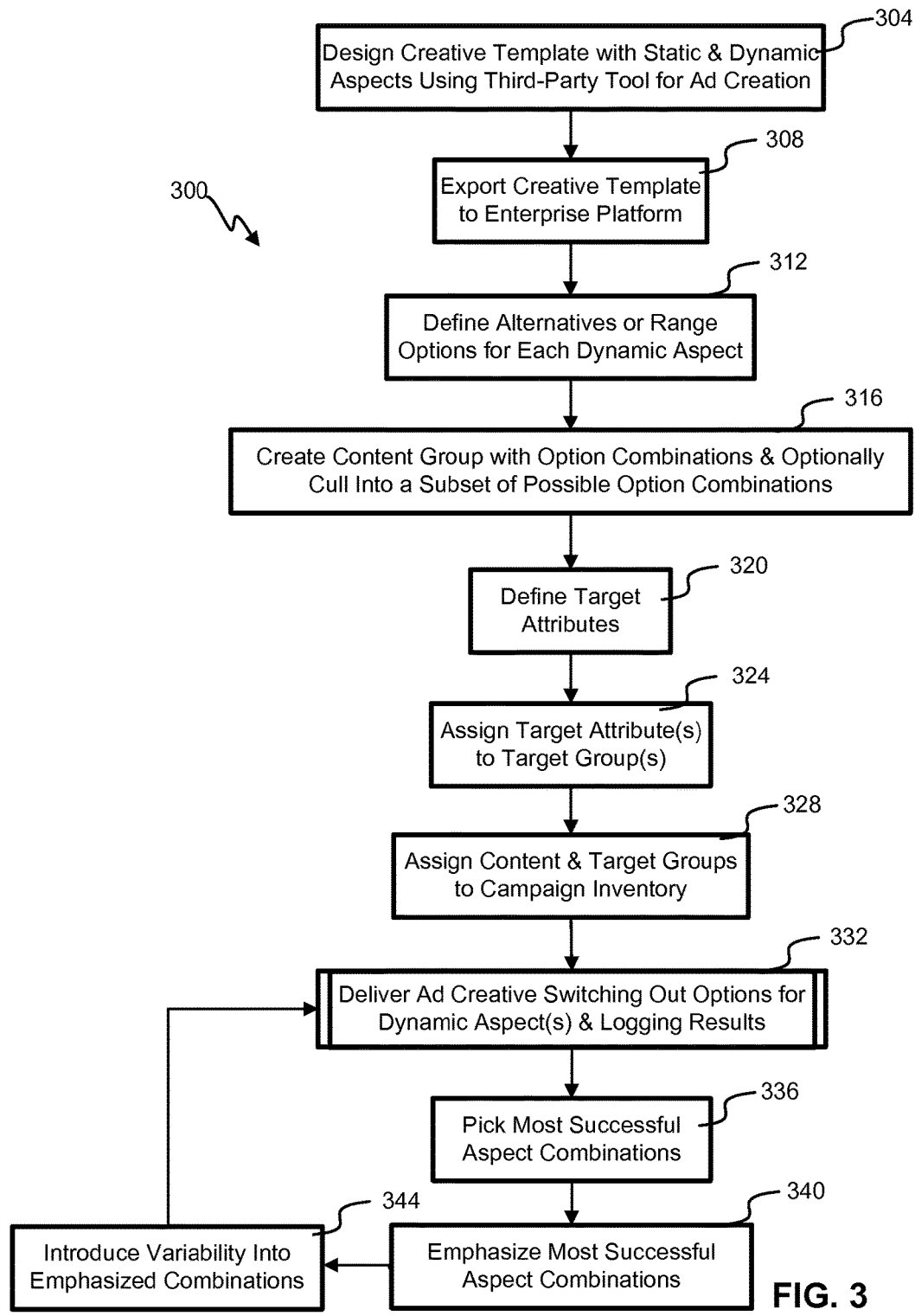
FIG. 3 illustrates a flowchart of an embodiment of a process for generating a dynamic creative.

Referring next to FIG. 3, a flow chart of an embodiment of a dynamic creative generation process 300 is shown. The depicted portion of the dynamic creative generation process 300 begins in block 304. The creative script template 200 is defined by the designer using the third-party ad creation tool 108, which is an off-the-shelf tool with plug-in or other customized features to allow defining static controls 112 and dynamic aspects 116. Often, the designer will start with a pre-formulated creative script template. Each dynamic aspect 116 is linked to its framework in the underlying ad script file. In block 308, the ad script file is exported or published to the enterprise platform 104 to further define how the frameworks for the dynamic aspects 116 will operate.

In block 312, aspect options are defined. Specific alternatives or ranges of options can be defined for each dynamic aspect 116. The content groups 136 with all or some of the dynamic aspects 116 are defined as combinations of options. Some option combinations can be excluded manually and/or automatically from the possible content groups. In block 320, the target attributes to use for each campaign are selected. For a specific campaign, target attributes and attribute values are defined into one or more target groups in block 324.

In block 328, the defined content groups 136 and target groups 128 are linked. Table IV gives an example of the different creative combinations of dynamic aspects and target groups 128.

TABLE IV

Content Group to Target Group Mapping & Results

| Creative Combo | Target | Score | Exclude? | Weight |
|---|---|---|---|---|
| 01 | 01 | 02 | Yes | .01% |
| 02 | 01 | 36 | No | .1% |
| 03 | 01 | 22 | No | .1% |
| 04 | 01 | 89 | No | .5% |
| 05 | 01 | 92 | No | .5% |
| 06 | 01 | 59 | No | .2% |
| ... | ... | ... | ... | ... |
| n | m | 12 | Yes | 0% |

Different permutations of the creative's combination of dynamic aspects can be manually and/or automatically excluded from use in delivering ads into a particular target group. In block 332, the ad script files are delivered with dynamic rendering of the combination of dynamic aspects to provide a customized experience. In some embodiments, ad script is rendered for each content group prior to request to avoid on-the-fly rendering after a viewer request. The results from those deliveries are logged and returned to the enterprise platform 104.

Success can be defined in any number of ways (e.g., interaction, click-throughs, playback, roll-over, etc.) for a particular creative's combination of dynamic aspects. The success is scored relative to all the ad creatives rendered for a particular target group. In the example of Table IV, each creative combination within a single target group is given a score of 1-100. Lower scores reflect less success than higher scores. The most successful ads are favored in block 336. A weighting is given as a percentage of future ads that will be served within each target group for the creative combinations. For example, the creative combination 05 when presented target group 01 received a score of 92 and will receive one half percent of the next group of ad impressions in block 340.

Any number of different algorithms can be used for the weighting and determining the exclusion list. Very poorly scored combinations below a threshold score of 15 are forever removed from the future impressions in this embodiment. This threshold is programmable and could be automatically excluded. Those above the threshold, but below a score of fifty are used rarely but could scale up to more frequent use if tastes of ad viewers change. Those with a score above fifty could be use in proportion to their success with respect to others. Other embodiments could use genetic algorithms, weighted average of score, etc. to define how often combinations would be used in the future.

Occasionally, even those below the lowest threshold could be tested again to see if tastes have changed to favor those combinations. Some option combinations fall out of favor and may not be viewed as frequently or at all. In block 344, some deemphasized option combinations are delivered to determine if they might resonate now despite past failure. The option combinations not algorithmically favored could be chosen randomly from the possible content groups. Other embodiments could use different techniques to select unfavored content groups, for example, randomly, past performance, round robin.

Figure 4:
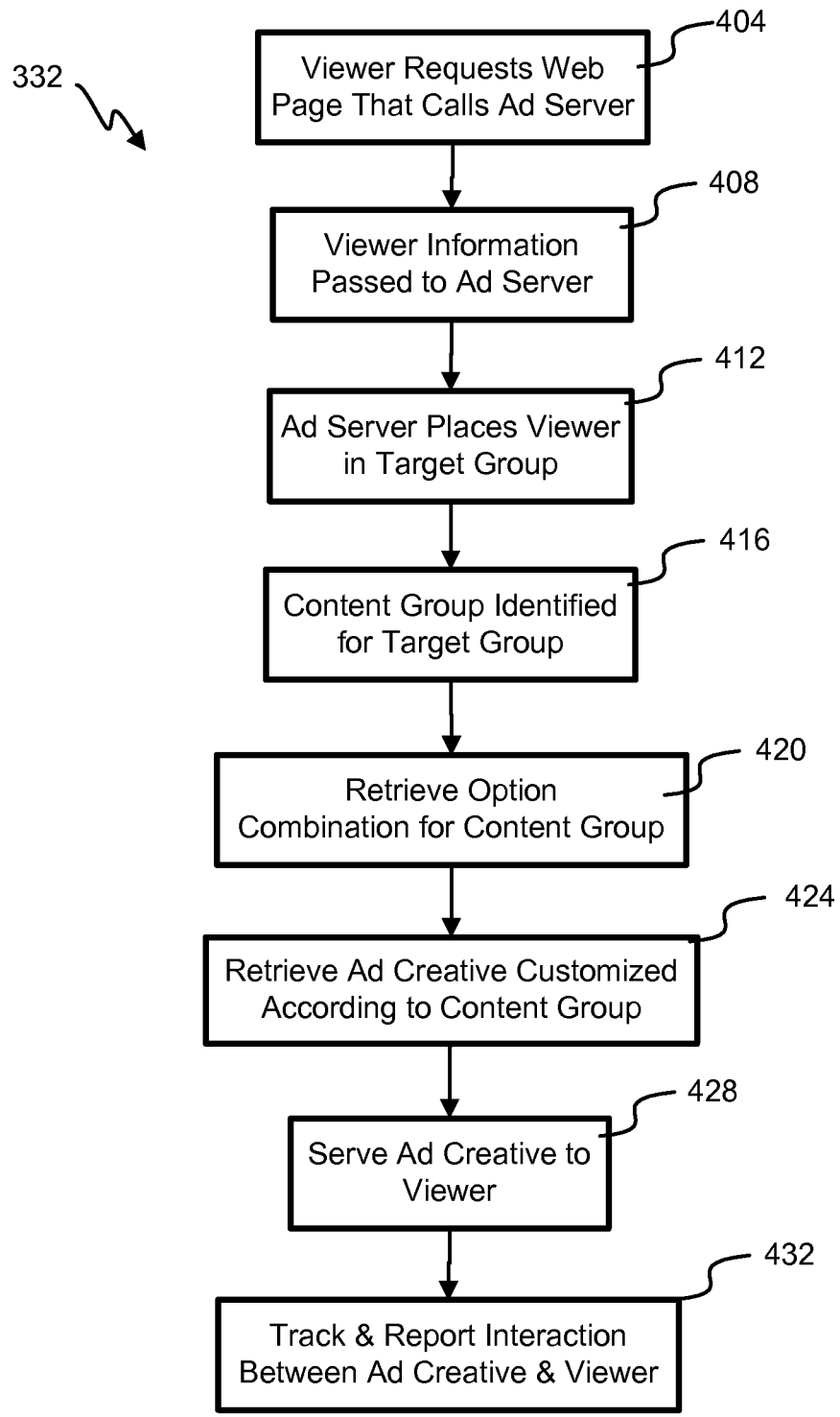
FIG. 4 illustrates a flowchart of an embodiment of a process for serving a dynamic creative.

With reference to FIG. 4, an embodiment of a process 332 for serving an ad creative is shown. This embodiment is an expansion of block 332 from FIG. 3. The depicted portion of the process 332 begins in block 404 where the viewer requests a web page or otherwise something that calls for an embedded ad creative. Viewer information is passed to the ad server in block 408. The ad server uses the viewer information to place the viewer in a target group in block 412. Based upon the mapping, a content group is chosen for the target group in block 416.

In block 420, the option combination for the content group is retrieved. In this embodiment, the ad creative is customized according to the option combination in the content group in block 424. The ad script is rendered and served to the viewer by passing a link to the web browser in block 428. The interaction between the ad and the viewer is reported in block 432. This process 332 is repeated for each ad served to each viewer to deliver ad creatives and test different content groups.

A number of variations and modifications of the disclosed embodiments can also be used. For example, the above embodiment leaves the third-party ad creation tool to define content groups, target groups, their mapping, and campaigns, but other embodiments could use windows and menus added into the third-party ad creation tool using APIs. Above embodiments compile the ad script choosing a combination of the dynamic aspects to include and deliver that static ad script to the end user device with a particular combination of dynamic aspects. The customizable dynamic aspects would be compiled into the script that is delivered according to attributes of the end user to provide a dynamic experience. Other embodiments could have frameworks that can dynamically modify how the ad is rendered by sending the complete ad script to the end user device that is customized at the end user device according to the target group by gathering the appropriate aspects that are part of the rendered ad. The ad could ask for a particular aspect and it would be decided elsewhere which aspect is returned for rendering in the ad.

Figure 5:
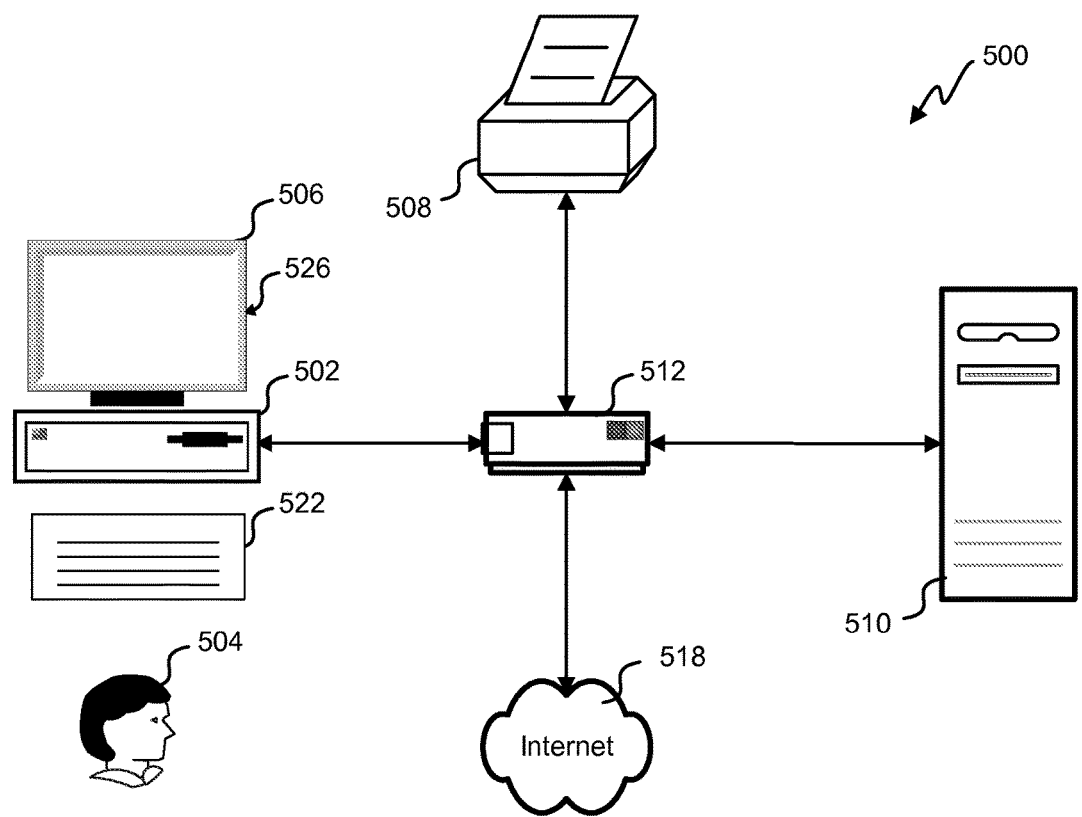
FIG. 5 depicts a block diagram of an embodiment of a computer system.

Referring next to FIG. 5, an exemplary environment with which embodiments may be implemented is shown with a computer system 500 that can be used by a designer 504 to design, for example, electronic designs. The computer system 500 can include a computer 502, keyboard 522, a network router 512, a printer 508, and a monitor 506. The monitor 506, processor 502 and keyboard 522 are part of a computer system 526, which can be a laptop computer, desktop computer, handheld computer, mainframe computer, etc. The monitor 506 can be a CRT, flat screen, etc.

A designer 504 can input commands into the computer 502 using various input devices, such as a mouse, keyboard 522, track ball, touch screen, etc. If the computer system 500 comprises a mainframe, a designer 504 can access the computer 502 using, for example, a terminal or terminal interface. Additionally, the computer system 526 may be connected to a printer 508 and a server 510 using a network router 512, which may connect to the Internet 518 or a WAN.

The server 510 may, for example, be used to store additional software programs and data. In one embodiment, software implementing the systems and methods described herein can be stored on a storage medium in the server 510. Thus, the software can be run from the storage medium in the server 510. In another embodiment, software implementing the systems and methods described herein can be stored on a storage medium in the computer 502. Thus, the software can be run from the storage medium in the computer system 526. Therefore, in this embodiment, the software can be used whether or not computer 502 is connected to network router 512. Printer 508 may be connected directly to computer 502, in which case, the computer system 526 can print whether or not it is connected to network router 512.

Figure 6:
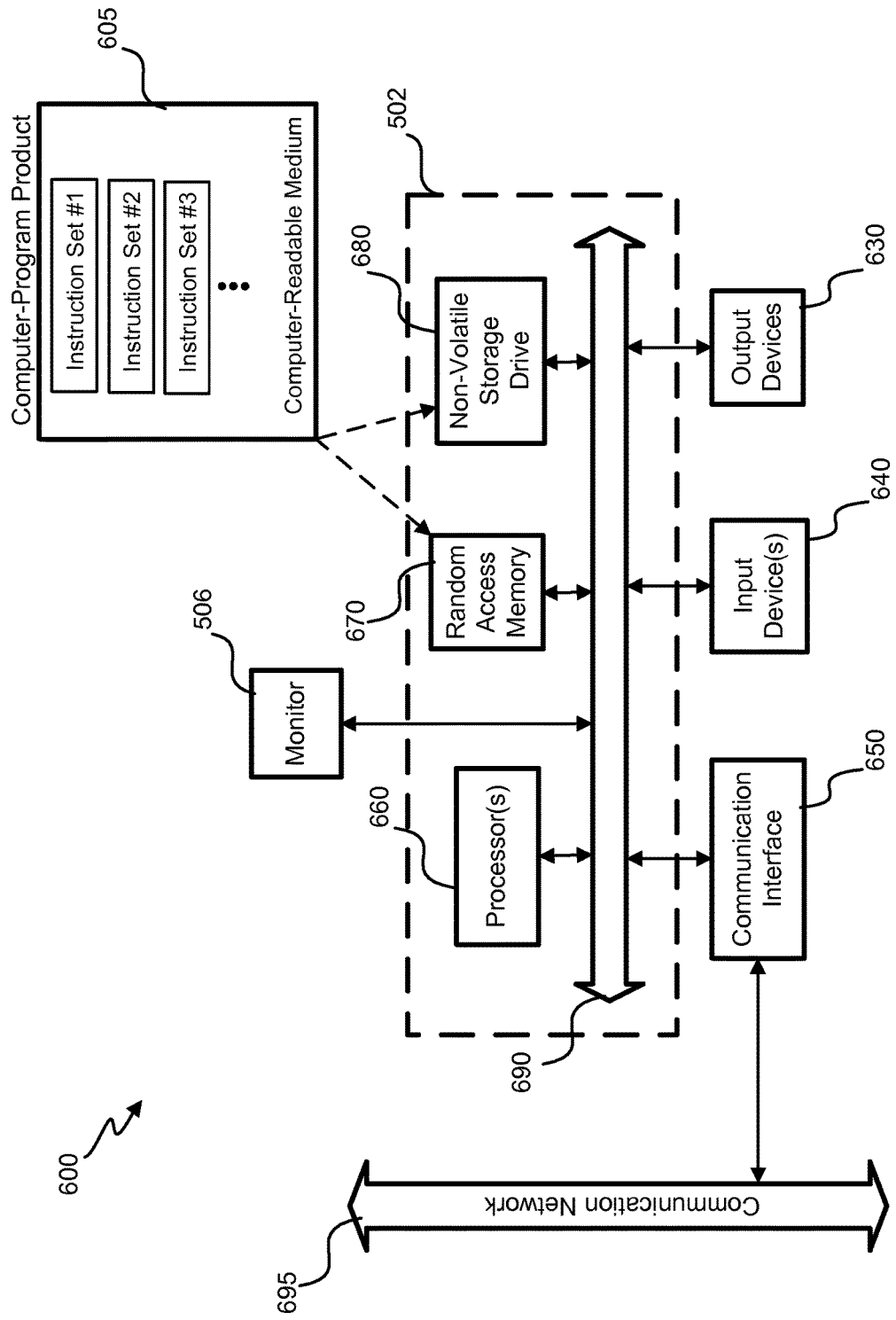
FIG. 6 depicts a block diagram of an embodiment of a special-purpose computer system.

With reference to FIG. 6, an embodiment of a special-purpose computer system 600 is shown. The enterprise platform 104 is one example of a special-purpose computer system 600. The third-party ad creation tool 108 may run on the enterprise platform 104 or another special-purpose computer system. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 526, it is transformed into the special-purpose computer system 600.

Special-purpose computer system 600 comprises a computer 502, a monitor 506 coupled to computer 502, one or more additional user output devices 630 (optional) coupled to computer 502, one or more user input devices 640 (e.g., keyboard, mouse, track ball, touch screen) coupled to computer 502, an optional communications interface 650 coupled to computer 502, a computer-program product 605 stored in a tangible computer-readable memory in computer 502. Computer-program product 605 directs system 600 to perform the above-described methods. Computer 502 may include one or more processors 660 that communicate with a number of peripheral devices via a bus subsystem 690. These peripheral devices may include user output device(s) 630, user input device(s) 640, communications interface 650, and a storage subsystem, such as random access memory (RAM) 670 and non-volatile storage drive 680 (e.g., disk drive, optical drive, solid state drive), which are forms of tangible computer-readable memory.

Computer-program product 605 may be stored in non-volatile storage drive 680 or another computer-readable medium accessible to computer 502 and loaded into memory 670. Each processor 660 may comprise a microprocessor, such as a microprocessor from Intel® or Advanced Micro Devices, Inc.®, or the like. To support computer-program product 605, the computer 502 runs an operating system that handles the communications of product 605 with the above-noted components, as well as the communications between the above-noted components in support of the computer-program product 605. Exemplary operating systems include Windows® or the like from Microsoft Corporation, Solaris® from Sun Microsystems, LINUX, UNIX, and the like.

User input devices 640 include all possible types of devices and mechanisms to input information to computer system 502. These may include a keyboard, a keypad, a mouse, a scanner, a digital drawing pad, a touch screen incorporated into the display, audio input devices such as voice recognition systems, microphones, and other types of input devices. In various embodiments, user input devices 640 are typically embodied as a computer mouse, a trackball, a track pad, a joystick, wireless remote, a drawing tablet, a voice command system. User input devices 640 typically allow a user to select objects, icons, text and the like that appear on the monitor 506 via a command such as a click of a button or the like. User output devices 630 include all possible types of devices and mechanisms to output information from computer 502. These may include a display (e.g., monitor 506), printers, non-visual displays such as audio output devices, etc.

Communications interface 650 provides an interface to other communication networks and devices and may serve as an interface to receive data from and transmit data to other systems, WANs and/or the Internet 518. Embodiments of communications interface 650 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 650 may be coupled to a computer network, to a FireWire® bus, or the like. In other embodiments, communications interface 650 may be physically integrated on the motherboard of computer 502, and/or may be a software program, or the like.

RAM 670 and non-volatile storage drive 680 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 670 and non-volatile storage drive 680 may be configured to store the basic programming and data constructs that provide the functionality of various embodiments of the present invention, as described above.

Software instruction sets that provide the functionality of the present invention may be stored in RAM 670 and non-volatile storage drive 680. These instruction sets or code may be executed by the processor(s) 660. RAM 670 and non-volatile storage drive 680 may also provide a repository to store data and data structures used in accordance with the present invention. RAM 670 and non-volatile storage drive 680 may include a number of memories including a main random access memory (RAM) to store of instructions and data during program execution and a read-only memory (ROM) in which fixed instructions are stored. RAM 670 and non-volatile storage drive 680 may include a file storage subsystem providing persistent (non-volatile) storage of program and/or data files. RAM 670 and non-volatile storage drive 680 may also include removable storage systems, such as removable flash memory.

Bus subsystem 690 provides a mechanism to allow the various components and subsystems of computer 502 communicate with each other as intended. Although bus subsystem 690 is shown schematically as a single bus, alternative embodiments of the bus subsystem may utilize multiple busses or communication paths within the computer 502.

While the principles of the disclosure have been described above in connection with specific apparatuses and methods, it is to be clearly understood that this description is made only by way of example and not as limitation on the scope of the disclosure.

What is claimed is:

1. A system for generating a dynamic creative for a plurality of individual interactions, the system comprising one or more memory devices containing instructions for the following:
   a module added to a third-party creation tool that allows selecting from a plurality of structures;
   the plurality of structures that are selectable from within the third-party creation tool, wherein each of the plurality of structures is configured:
   to switch between a plurality of alternative selections when the creative is run,
   for graphically-manipulated insertion into the creative, and
   for integration into a script representing the creative, wherein the script is run on an end user device and the creative dynamically changes according to the plurality of alternative selections when run, locally, on a plurality of end user devices; and a platform configured to:
receive selection of a content group that correlates to the plurality of alternative selections,
receive selection of a target group comprising a plurality of attributes describing viewers of the creative,
determine that a viewer of the creative is in the target group,
select, after a user request, an alternative selection from the plurality of alternative selections based on the determination that the viewer of the creative is in the target group,
process the alternative selection with a structure from the plurality of structures to customize the creative to the alternative selection that is associated with the content group,
receive feedback, based on the plurality of individual interactions with the dynamic creative, on how the content group is being received by the target group, and
modify how often the plurality of alternative selections are presented in the script for the target group without regard to how the content group is being received by viewers.

2. The system for generating the dynamic creative as recited in claim 1, wherein the third party creation tool edits a scripting language.

3. The system for generating the dynamic creative as recited in claim 1, wherein the creative is customized to the alternative selection away from an end user device rendering the creative for the viewer.

4. The system for generating the dynamic creative as recited in claim 1, wherein the target group is a function of viewer attributes.

5. The system for generating the dynamic creative as recited in claim 1, wherein the content group defines a plurality of options that define the alternative selections.

6. The system for generating the dynamic creative as recited in claim 1, wherein the plurality of alternative selections is defined as a range in the module.

7. A method for generating a dynamic creative for a plurality of individual interactions, the method comprising:
providing, using a computer, a plurality of structures that are selectable from within a third party creation tool, wherein each of the plurality of structures is configured:
to switch between a plurality of alternative selections when the creative is run,
for graphically-manipulated insertion into the creative, and
for integration into a script representing the creative, wherein the script is run on an end user device and the creative dynamically changes according to the plurality of alternative selections when run, locally, on a plurality of end user devices;
receiving, using a computer, selection of a content group that correlates to the plurality of alternative selections;
receiving, using a computer, selection of a target group comprising a plurality of attributes describing viewers of the creative;
determining, using a computer, that a viewer of the creative is in the target group;
selecting, using a computer and after a user request, an alternative selection from the plurality of alternative selections based on the determination that the viewer of the creative is in the target group;
processing, using a computer, the alternative selection with a structure from the plurality of structures to customize the creative to the alternative selection that is associated with the content group;
receiving, using a computer, feedback, based on the plurality of individual interactions with the dynamic creative, on how the content group is being received by the target group viewing the dynamic creative; and
modifying, using a computer, how often the plurality of alternative selections are presented in the script for the target group without regard to how the content group is being received by viewers.

8. The method for generating the dynamic creative as recited in claim 7, wherein the creative is customized to the alternative selection away from an end user device rendering the creative for the viewer.

9. The method for generating the dynamic creative as recited in claim 7, wherein the target group is a function of viewer attributes.

10. The method for generating the dynamic creative as recited in claim 7, further comprising:
receiving a range that defines a subset of the plurality of alternative selections;
customizing an instance of the creative according to the subset.

11. The method for generating the dynamic creative as recited in claim 7, wherein the content group defines a plurality of options that define the alternative selections.

12. One or more non-transitory machine-readable media having machine-executable instructions configured to generating a dynamic creative for a plurality of individual interactions, comprising code for:
providing a plurality of structures that are selectable from within a third party creation tool, wherein each of the plurality of structures is configured:
to switch between a plurality of alternative selections when the creative is run,
for graphically-manipulated insertion into the creative, and
for integration into a script representing the creative, wherein the script is run on an end user device and the creative dynamically changes according to the plurality of alternative selections when run, locally, on a plurality of end user devices;
receiving selection of a content group that correlates to the plurality of alternative selections;
receiving selection of a target group comprising a plurality of attributes describing viewers of the creative;
determining that a viewer of the creative is in the target group;
selecting, after a user request, an alternative selection from the plurality of alternative selections based on the determination that the viewer of the creative is in the target group;
processing the alternative selection with a structure from the plurality of structures to customize the creative to the alternative selection that is associated with the content group;
receiving feedback, based on the plurality of individual interactions with the dynamic creative, on how the content group is being received by the target group; and
modifying how often the plurality of alternative selections are presented in the script for the target group without regard to how the content group is being received by viewers.

13. One or more physical machine-readable media having machine-executable instructions configured to generating the dynamic creative as recited in claim 12, wherein the creative is customized to the alternative selection away from an end user device rendering the creative for the viewer.

14. One or more physical machine-readable media having machine-executable instructions configured to generating the dynamic creative as recited in claim 12, further comprising code for:

receiving a range that defines a subset of the plurality of alternative selections; and customizing an instance of the creative according to the subset.

15. One or more physical machine-readable media having machine-executable instructions configured to generating the dynamic creative as recited in claim 12, wherein the target group is a function of viewer attributes.

16. One or more physical machine-readable media having machine-executable instructions configured to generating the dynamic creative as recited in claim 12, wherein the content group defines a plurality of options that define the alternative selections.

17. A system for generating a dynamic creative for a plurality of individual interactions, the system comprising one or more memory devices containing instructions for the following:

a module added to a third-party creation tool that allows selecting from a plurality of structures;

the plurality of structures that are selectable from within the third-party creation tool, wherein each of the plurality of structures is configured:

to switch between a plurality of alternative selections when the creative is run, for graphically-manipulated insertion into the creative, and for integration into a script representing the creative, wherein the script is run on an end user device and the creative dynamically changes according to the plurality of alternative selections when run, locally, on a plurality of end user devices; and a platform configured to:

receive selection of a content group that correlates to the plurality of alternative selections, receive selection of a target group comprising a plurality of attributes describing viewers of the creative, determine that a viewer of the creative is in the target group, select, after a user request, an alternative selection from the plurality of alternative selections based on the determination that the viewer of the creative is in the target group, process the alternative selection with a structure from the plurality of structures to customize the creative to the alternative selection that is associated with the content group, receive feedback, based on the plurality of individual interactions with the dynamic creative, on how the content group is being received by the target group, and modify how often the plurality of alternative selections are presented in the script for the target group; wherein:

the platform is further configured to determine successful alternative selections and poor alternative selections from received feedback based on the plurality of individual interactions with the dynamic creative by:

assigning scores to the alternative selections;

successful alternative selections are identified by receiving a score above a first value;

poor alternative selections are identified by receiving a score below a second value; and the first value is greater than the second value; and the platform is configured to modify how often the plurality of alternative selections are presented by:

emphasizing successful alternative selections; and introducing variability by presenting the alternative selections that include alternative selections that were determined previously to be poor alternative selections.

* * * * *